(12) United States Patent
Callan et al.

(10) Patent No.: US 11,422,006 B2
(45) Date of Patent: Aug. 23, 2022

(54) DEVICE ORIENTATION SENSOR

(71) Applicant: Microsoft Technology Licensing, LLC, Redmond, WA (US)

(72) Inventors: Casey Sean Callan, Seattle, WA (US); Mika Martti Yitalo, Seattle, WA (US); Sheila A. Longo, Seattle, WA (US); Brady James Toothaker, Longmont, CO (US); Srinivas Reddy Nagampet, Cumming, GA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/905,805

(22) Filed: Jun. 18, 2020

(65) Prior Publication Data
US 2021/0396549 A1 Dec. 23, 2021

(51) Int. Cl.
*G01D 5/14* (2006.01)
*G06F 3/03* (2006.01)

(52) U.S. Cl.
CPC .............. *G01D 5/145* (2013.01); *G06F 3/03* (2013.01)

(58) Field of Classification Search
CPC ................................ G01D 5/145; G06F 3/03
See application file for complete search history.

(56) References Cited

U.S. PATENT DOCUMENTS

| | | | |
|---|---|---|---|
| 7,907,979 B2 | 3/2011 | Yamaguchi et al. | |
| 8,890,802 B2 | 11/2014 | Case, Jr. et al. | |
| 9,389,647 B2 | 7/2016 | Hwang | |
| 9,407,805 B2 | 8/2016 | Ohtaka et al. | |
| 9,897,465 B2 | 2/2018 | DiFonzo et al. | |
| 10,210,975 B1 | 2/2019 | Ji et al. | |
| 10,338,642 B2 | 7/2019 | Furlong et al. | |
| 10,503,207 B1 | 12/2019 | Knoppert et al. | |
| 10,996,720 B2 * | 5/2021 | Hu ....................... | G01R 33/072 |
| 2004/0056651 A1 | 3/2004 | Marietta Bersana | |
| 2009/0051174 A1 * | 2/2009 | Ho ....................... | G06F 1/1677 |
| | | | 292/251.5 |
| 2016/0123054 A1 * | 5/2016 | Senatori .................... | E05D 3/18 |
| | | | 361/679.27 |
| 2020/0387197 A1 * | 12/2020 | Itoh ....................... | G06F 1/1679 |

FOREIGN PATENT DOCUMENTS

EP 2966413 A1 1/2016

OTHER PUBLICATIONS

Kendrick, James, "Belkin Ultimate Keyboard Case for iPad: It's the magnets (review)", Retrieved From: http://www.zdnet.com/belkin-ultimate-keyboard-case-for-ipad-its-themagnets-review-7000013164/, Mar. 27, 2013, 5 Pages.
Purdy, Kevin, "Apple Put a Hinge Sensor in the 16? MacBook Pro. What Could It Be For?", Retrieved from: https://www.ifixit.com/News/33952/apple-put-a-hinge-sensor-in-the-16-macbook-pro-what-could-it-be-for, Nov. 20, 2019, 8 pages.
"International Search Report and Written Opinion Issued in PCT Application No. PCT/US21/028514", dated Jul. 16, 2021, 10 Pages.

* cited by examiner

*Primary Examiner* — Clayton E. LaBalle
*Assistant Examiner* — Michael A Harrison
(74) *Attorney, Agent, or Firm* — Rainier Patents, P.S.

(57) ABSTRACT

The description relates to devices and/or device accessories. One example can include a Hall effect sensor configured to sense magnetic fields along a sensing axis and a pair of elongate magnets having co-axial and opposite magnetic axes that are perpendicular to the sensing axis.

20 Claims, 16 Drawing Sheets

DEVICE ORIENTATION SENSOR

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced. Where space permits, elements and their associated reference numbers are both shown on the drawing page for the reader's convenience. Otherwise, only the reference numbers are shown.

DESCRIPTION

The present concepts relate to position or orientation sensors for devices, such as computing devices that have rotatable portions and/or accessories. These devices may be constrained in one or more dimensions, such as thickness. The sensors can be manifest as Hall effect sensors and sets of elongate magnets that are sensed by the Hall effect sensors. The arrangement of the Hall effect sensors and sets of magnets can allow positioning in dimensionally constrained devices which lack space for traditional sensor configurations while also providing more orientation data than traditional sensor configurations.

Figure 1A:
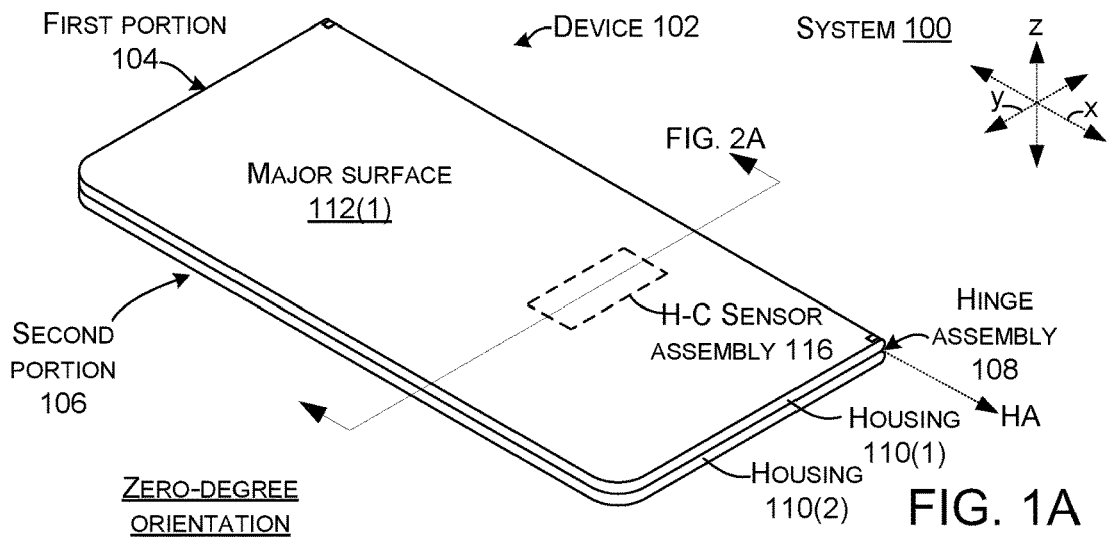
FIGS. 1A-1C, 4A-4F, 5A, 5B, and 7-10 show perspective views of example devices in accordance with some implementations of the orientation sensing concepts.
Figure 1B:
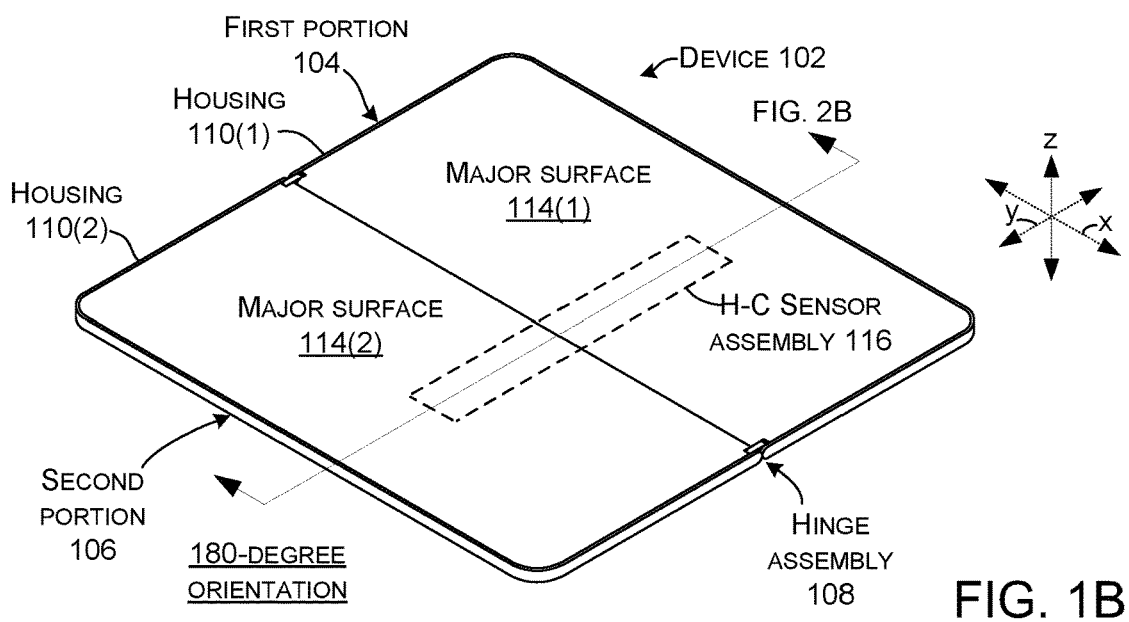
Figure 1C:
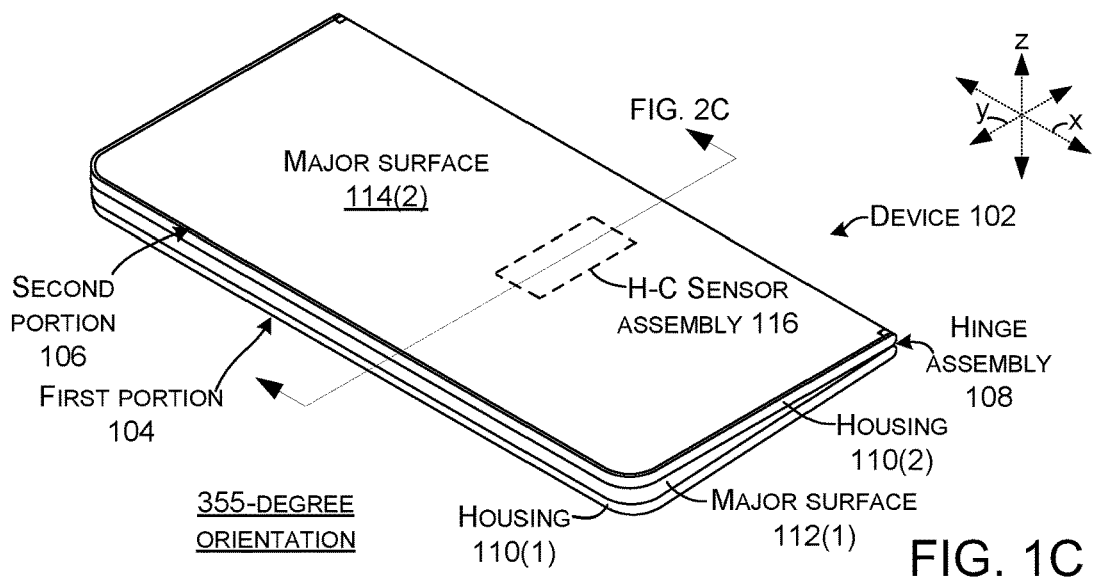

Introductory FIGS. 1A-1C collectively show a system 100 that can include an example device 102 in the form of a foldable computing device that has a first portion 104 and a second portion 106. The first portion and the second portion can be rotatably secured by a hinge assembly 108. The hinge assembly 108 can define one or more axes of rotation or hinge axes (HA). The hinge assembly 108 can facilitate rotation of the first and second portions 104 and 106 through a range of rotations. In this case, the range of rotations includes 360 degrees of rotation (e.g., from the zero-degree orientation of FIG. 1A where the first portion is on top of and positioned against the second portion, through the side-by-side 180-degree orientation of FIG. 1B, past the 355-degree orientation of FIG. 1C to a 360-degree orientation where the first portion is under and against the second portion. Other implementations may have different ranges of rotation, such as a zero-degree to 180-degree range of rotation, for example.

The first and second portions 104 and 106 can include a housing or chassis 110 and can define first and second major surfaces 112 and 114 (e.g., front and back surfaces). In this implementation, thicknesses of the first and second portions 104 and 106 are constrained in the z reference direction. Further, many device components, such as displays, processors, batteries, heat pipes, etc., compete for the thickness. In this case, the device 102 can also include a height-constrained sensor assembly 116 that can fit within the thickness constraints of the first and second portions 104 and 106.

The height-constrained sensor assembly 116 can sense the relative orientations of the first and second portions 104 and 106, while conforming to the limited space. For instance, the height-constrained sensor assembly 116 can distinguish the zero-degree orientation of FIG. 1A, the 180-degree orientation of FIG. 1B, and the 355-degree orientation of FIG. 1C, from one another.

Figure 2A:
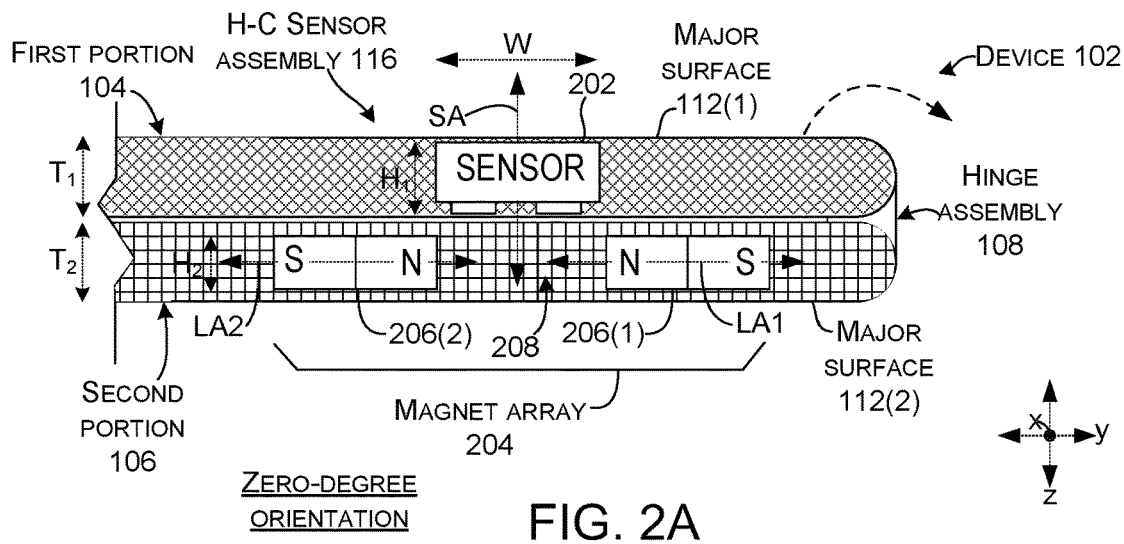
FIGS. 2A-2C and 3A-3D show sectional views of example devices in accordance with some implementations of the orientation sensing concepts.
Figure 2B:
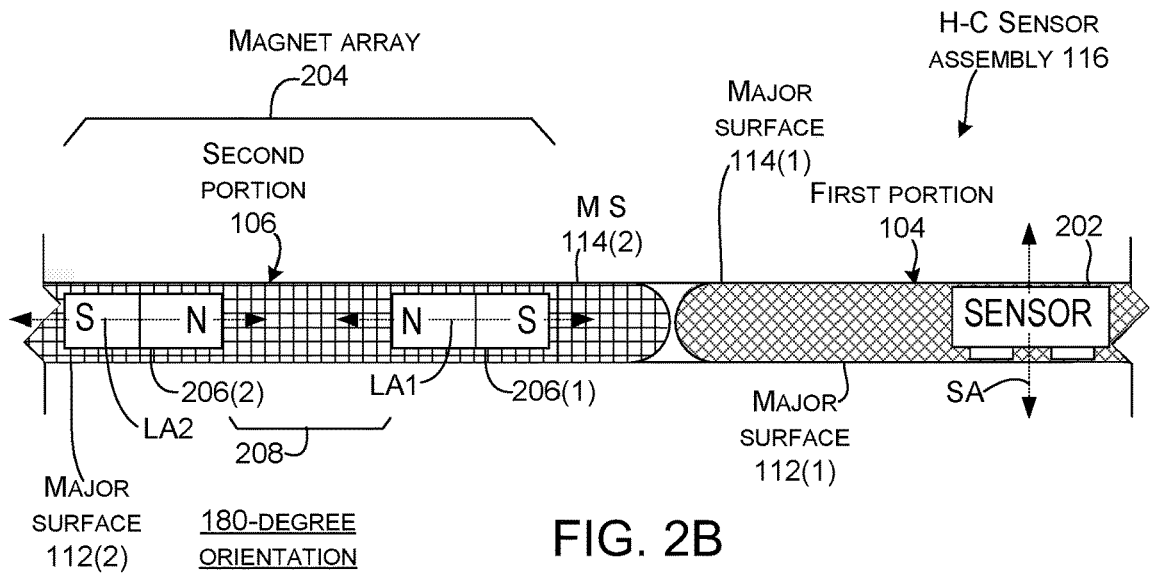
Figure 2C:
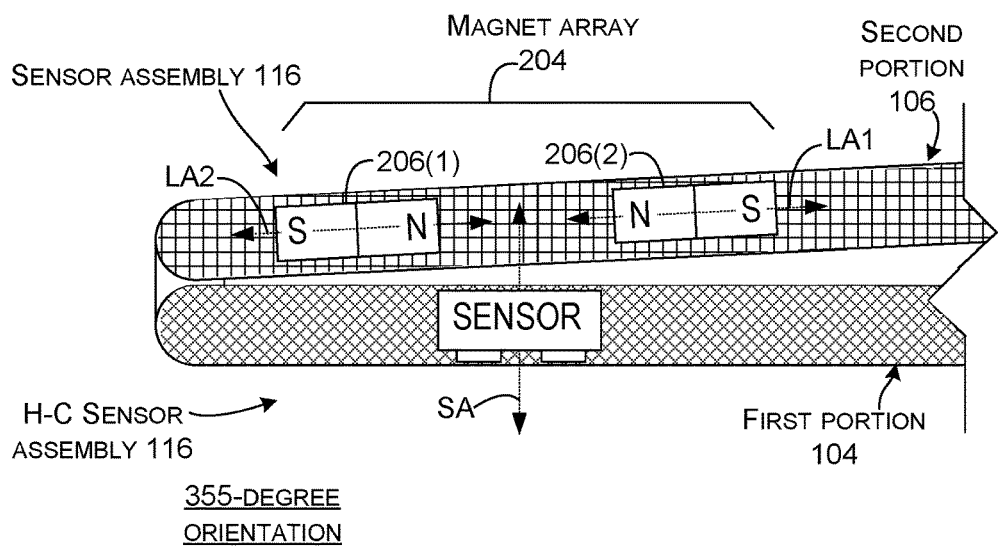

FIGS. 2A-2C are sectional views as indicated in FIGS. 1A-1C and collectively show additional details of an example height-constrained sensor assembly 116. In this case, the height-constrained sensor assembly 116 includes a Hall effect sensor 202 positioned in the first portion 104 and a magnet array 204 positioned in the second portion 106. Note that the positioning could be reversed with the magnet array 204 in the first portion and the Hall effect sensor 202 in the second portion. The Hall effect sensor 202 can be configured to sense magnetic fields along a sensing axis (SA). In this case, the Hall effect sensor is oriented so that the sensing axis is perpendicular to the first and second surfaces 112(1) and 114(1) of the first portion 104. This configuration can allow the Hall effect sensor 202 to have a height $H_1$ that is less than thickness $T_1$ of the first portion 104.

In this implementation, the magnet array 204 includes first and second elongate magnets 206. The elongate magnets can define a long axis (LA) that extends through their North and South poles. In this case, the long axes are substantially parallel and co-axially arranged with one another and parallel to the major surfaces 112(2) and 114(2) of the second portion. As used herein, 'substantially parallel' can be defined as the long axes of the elongate magnets being parallel or within ten degrees of being parallel, for instance. This magnet configuration can allow the magnets 206 to be installed in the more constrained height $H_2$ than previous configurations where the magnets were aligned perpendicular to the first and second surfaces 112(2) and 114(2) e.g., the long axis was perpendicular to the first and second surfaces. Stated another way, the opposing magnets 206 that have long axes and magnetic axes that are co-axial to one another and arranged parallel to the first and second surfaces 112(2) and 114(2) can allow magnet array 204 to have a height $H_2$ that is less than thickness $T_2$ of the second portion 106.

The magnet configuration of the present implementations can also enable more determinative sensing by the Hall effect sensors 202 than could be obtained with traditional magnet configurations where the long axis of the magnet was parallel to the sensing axis when the first and second portions were positioned against one another, such as in the zero-degree orientation and/or the 360-degree orientation. These aspects are discussed in more detail below relative to FIGS. 3A-3D.

In the illustrated configuration, the magnets 206 are spaced apart laterally by a distance that is equivalent to a width W of the Hall effect sensor 202. In this case, the distance is occupied by an intervening material 208 in the form of air, but other intervening materials can be employed. Other examples are described in the discussion below relative to FIGS. 5A and 5B. In other implementations, the magnets 206 may be spaced closer together or farther apart than the illustrated configuration of FIGS. 2A-2C.

In the illustrated configuration, the North poles of the magnets 206 are facing one another. In other implementations, the South poles could be facing one another. Further, the illustrated implementation employs the two co-axial magnets 206(1) and 206(2) are positioned 180 degrees apart. Other implementations could employ more magnets in the magnet array 204. For instance, some implementations could employ four magnets (e.g., one on the left of and oriented the same as magnet 206(2) and one on the right of and oriented the same as magnet 206(1). One such example is illustrated relative to FIG. 8. Another implementation may utilize a magnet and another material in the magnetic array. For instance, magnet 206(2) could be paired with another material, such as a metal block or metal rod replacing magnet 206(1). One such example is illustrated relative to FIG. 10. Other implementations may arrange the magnetic array differently than the illustrated 180-degree orientation. For instance, the magnet array could entail three magnets 206 arranged 120 degrees apart in a plane that is parallel to first surface 112(2). Each magnet could have the same pole facing inwardly (e.g., all North pole or all South pole). Similarly, the magnet array 204 could entail four magnets arranged with 90 degrees between each magnet 206. One such example is illustrated relative to FIG. 9.

FIGS. 3A-3D collectively show how the present orientation sensing concepts can provide more meaningful rotational orientation data than previous solutions while occupying less height within the device than previous solutions.

Figure 3A:
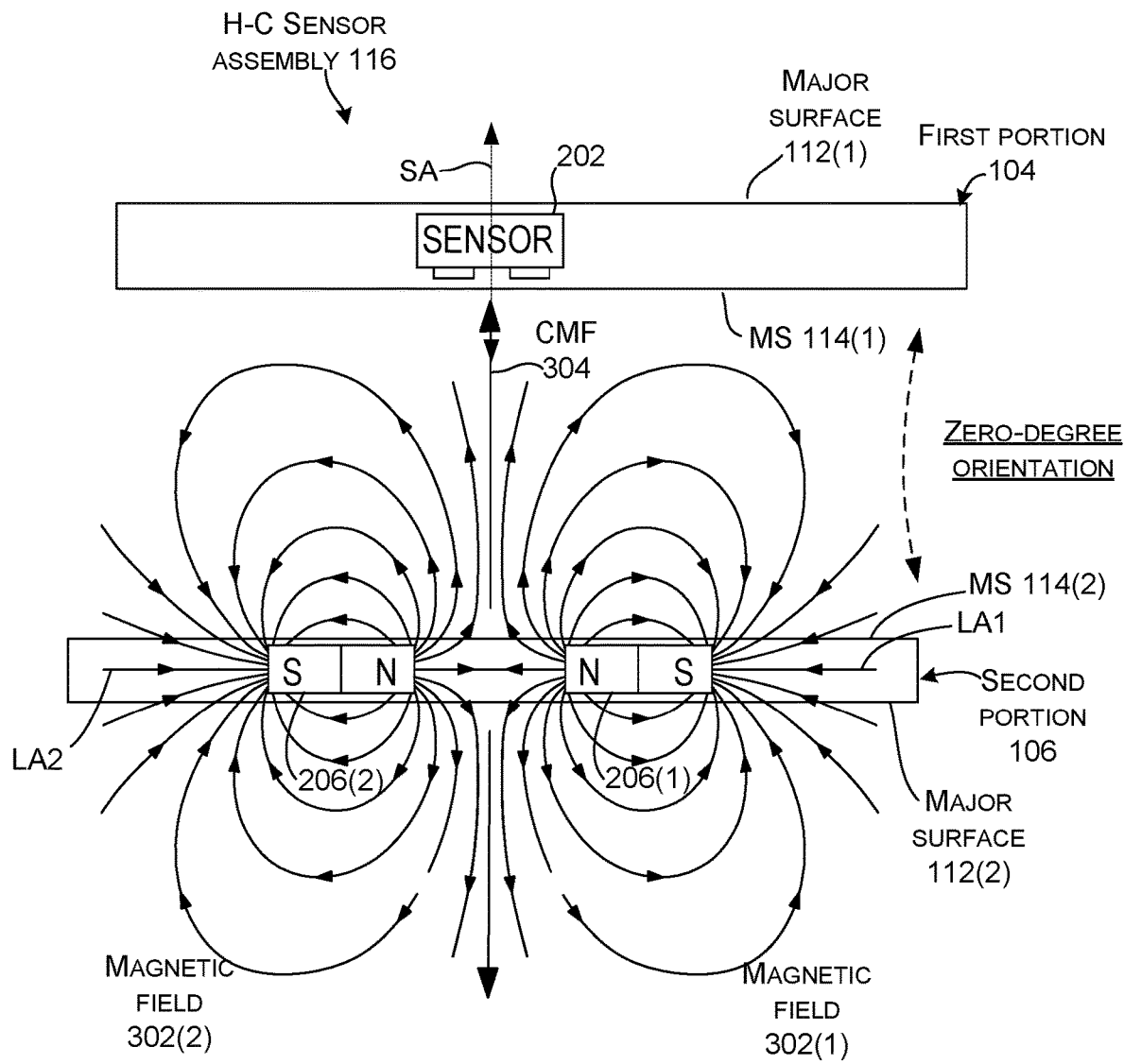

FIG. 3A shows first and second portions 104 and 106 of the device 102 approaching a zero-degree orientation with the Hall effect sensor 202 positioned directly above the magnet array 204 (e.g., the first portion 104 over the second portion 106). In this case, the North poles of the magnets 206(1) and 206(2) are physically facing toward one another. The magnetic fields (e.g., magnetic field lines) 302 of the magnets 206 are also opposing one another (e.g., interacting with one another). For purposes of explanation this opposing interaction of the two magnetic fields 302 can be viewed as creating a collective magnetic field (CMF) 304 that is different from either of the magnetic fields 302 in isolation. The collective magnetic field 304 can entail a flux extending away from the magnet array 204 at right angles to the first and second surfaces 112(2) and 114(2) and the long axes of the magnets.

Figure 3B:
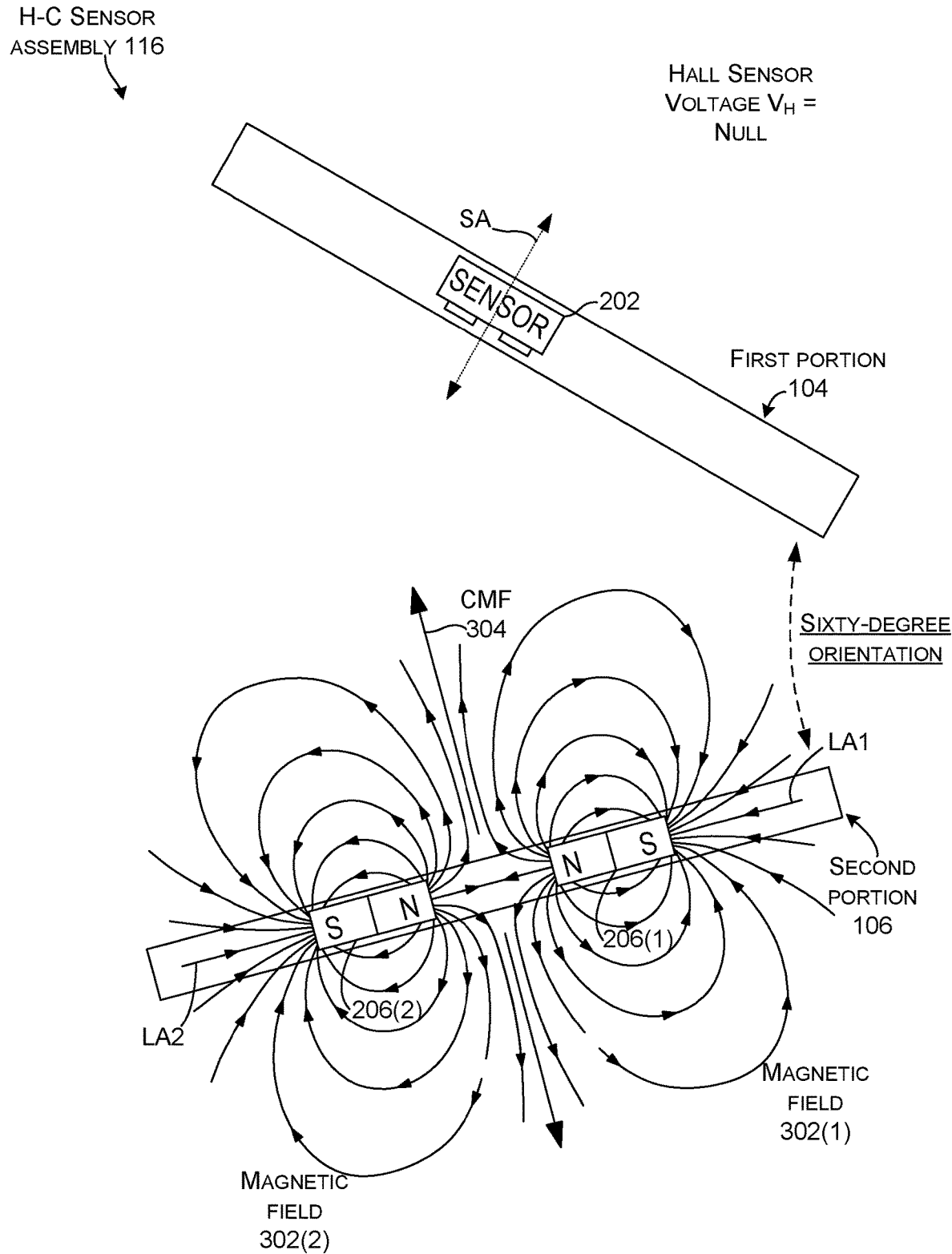
Figure 3C:
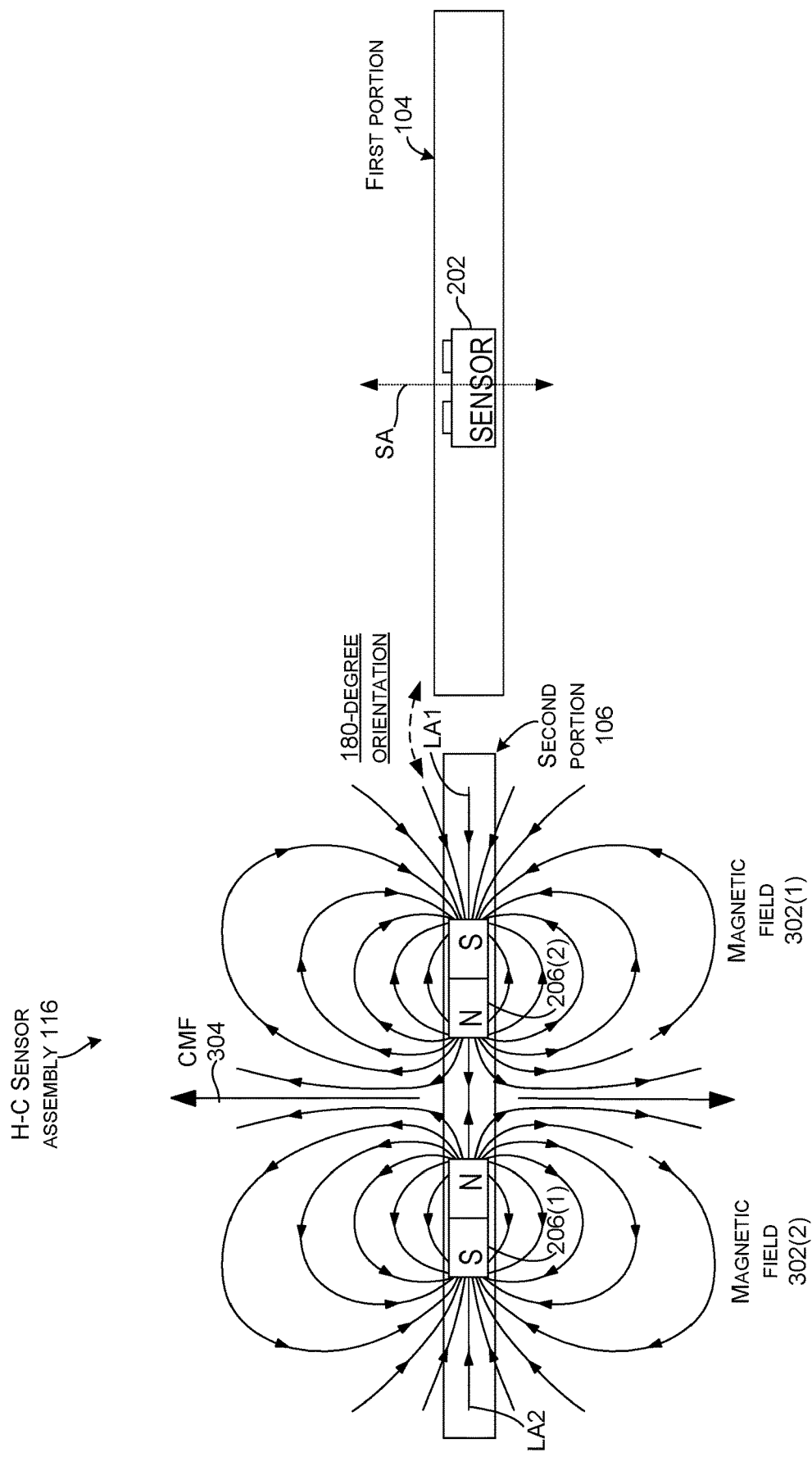
Figure 3D:
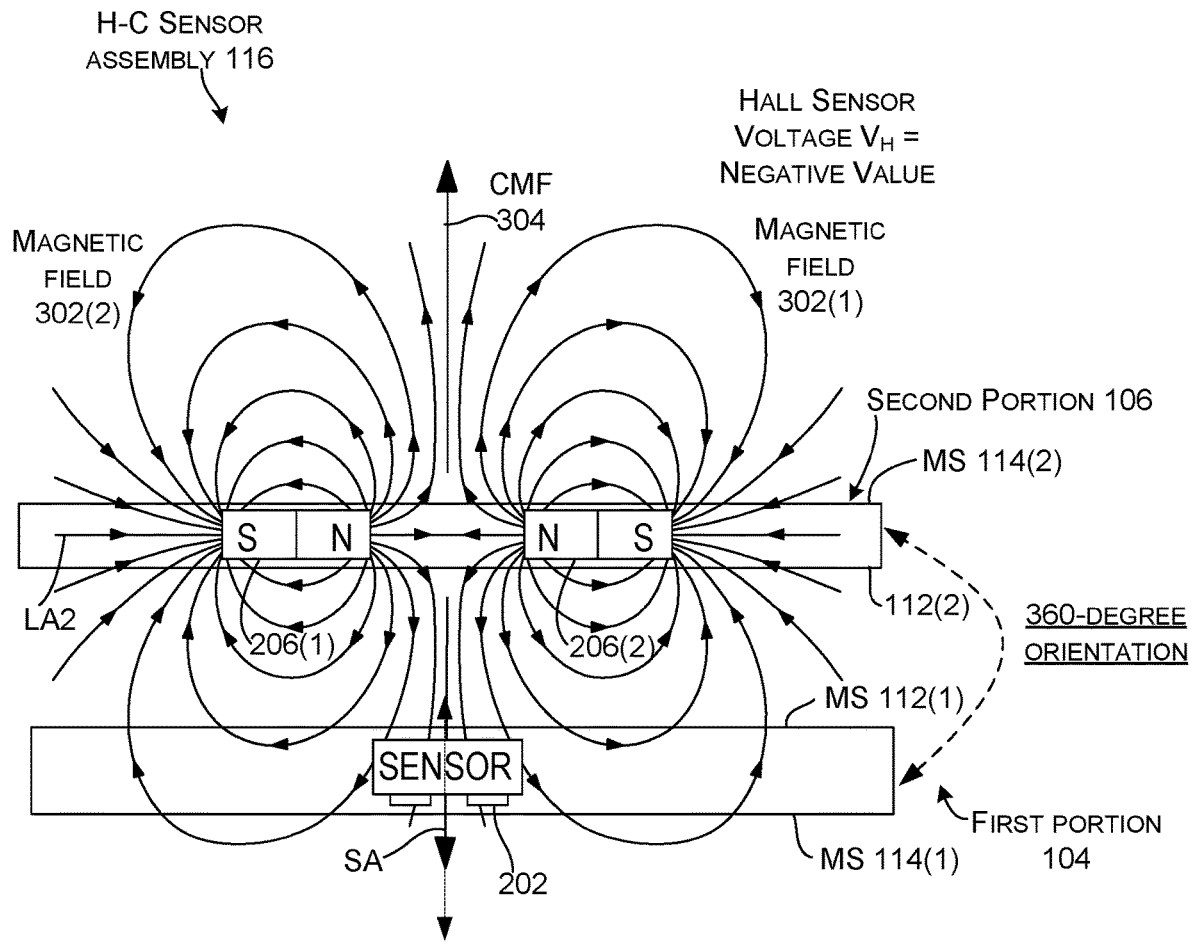

Note that the Hall effect sensor 202 is sensitive to the directionality of the flux and thus can generate different outputs when the flux is passing though the Hall effect sensor from top-to-bottom of FIG. 3D and bottom-to-top of FIG. 3A. Stated another way, the polarity generated by the magnet array 204 emanating through major surface 112(2) is different than the polarity emanating through major surface 114(2). The Hall effect sensor 202 can be sensitive to and produce different output when subjected to these two different polarities. These aspects are leveraged in the explanation below.

The collective magnetic field 304 is extending in part, out of, and at right angles to, major surfaces 112(2) and 114(2). In FIG. 3A, the collective magnetic field 304 is co-extensive with the sensing axis (SA) of the Hall effect sensor 202, which in this zero-degree orientation is directly above the magnet array 204. In this orientation, the collective magnetic field 304 would be sensed along the sensing axis of the Hall effect sensor 202. This sensing would cause the Hall effect sensor 202 to produce an output voltage that can be determinative of the device orientation. For instance, the output voltage can be mapped to a listing or mapping table of known orientations and associated output voltages. For example, testing can be performed on a device of a particular model to determine output voltages at defined orientations. The mapping can provide output voltages relating to defined orientations of device portions and/or defined distances between device portions proximate to the height-constrained sensor assemblies. These values can be utilized to populate the mapping table. The mapping table can be stored on devices of that model and can be accessed in real-time by the device, such as a processor or controller that is communicatively coupled to receive output voltages from the height-constrained sensor assemblies.

FIG. 3B shows the first and second portions 104 and 106 rotated to about a 60-degree orientation (e.g., 60 degrees of rotation from the closed orientation of FIG. 3A). At this point, the collective magnetic field 304 generated by the magnets 206 is too far from and/or at the wrong angle to (e.g., not coaxial with) the sensing axis and as such, is not sensed by the Hall effect sensor 202 sufficiently to create an output voltage. This null output voltage can be determinative of the orientation. For instance, the null output voltage can be mapped as being an indefinite angle (e.g., not being a zero-degree orientation (or in a range close to zero degrees) and not being a 360-degree orientation (or in a range close to 360 degrees)).

FIG. 3C shows the first and second portions 104 and 106 rotated to about a 180-degree orientation (e.g., 180 degrees of rotation from the closed orientation of FIG. 3A). At this point, the collective magnetic field 304 is too far from the sensing axis and as such, is not sensed by the Hall effect sensor 202 sufficiently to create an output voltage. This null output voltage can be determinative of the orientation. For instance, the null output voltage can be mapped as being an indefinite angle (e.g., not being a zero-degree orientation (or in a range close to zero degrees)) and not being a 360-degree orientation (or in a range close to 360 degrees)).

FIG. 3D shows first and second portion 104 and 106 of the device 102 approaching a 360-degree orientation (e.g., 360 degrees of rotation relative to the zero-degree orientation of FIG. 3A) with the Hall effect sensor 202 positioned directly below the magnet array 204 (e.g., the first portion 104 over the second portion 106). In this orientation, the collective magnetic field 304 is aligned with the sensing axis of the Hall effect sensor but at the opposite directionality from the zero-degree orientation of FIG. 3A.

The collective magnetic field 304 can be sensed by the Hall effect sensor 202 and causes the Hall effect sensor to generate an output voltage $V_H$. This output voltage is determinative of the orientation of the first and second portions 104 and 106. For instance, this output voltage can be mapped to the 360-degree orientation or a small range of orientations that includes 360 degrees, such as a range of 355-360 degrees). Stated another way, the output voltage at this 360-degree orientation is distinct from the output voltage at other orientations including the illustrated zero-degree orientation, 60-degree orientation, and 180-degree orientation.

In contrast, traditional magnet and Hall effect sensor configurations do not produce definitive output voltages through a range of orientations. For instance, with these previous solutions the output voltage at zero degrees and at 360 degrees are equivalent because the Hall effect sensor senses or 'sees' the same polarity whether it is above or below the magnet. Thus, the output of the Hall effect sensor is non-determinative in that it cannot distinguish a zero-degree orientation from a 360-degree orientation.

To partially address this non-determinative shortcoming of traditional Hall effect sensor configurations, magnetic shielding is sometimes added above or below the Hall effect sensor so that the sensor only sensed the magnetic field in one orientation (e.g., when the magnet was on the non-shielded side). This decreased the orientation information that a single Hall effect sensor could provide. Thus, two Hall effect sensors would have to be employed to accomplish a similar functionality: one for sensing the zero-degree orientation and another one for sensing the 360-degree orientation. Further, the magnetic shielding requires thickness in addition to the height of the Hall effect sensor. As mentioned above, this extra thickness is not available in many thickness-constrained devices.

Thus, with the present implementations, a device orientation produces an output voltage from the Hall effect sensor that is determinative (e.g., unique to that orientation). For instance, in the illustrated configuration, the zero-degree orientation may produce a first output voltage, 5 degrees to 355 degrees may produce a null output voltage, and 356 to 360 degrees may produce a second output voltage that is different from the first. In some cases, the second output voltage may be an equivalent but opposite value. Other implementations can have other output voltages than those provided here for purposes of explanation. The emphasis of the discussion is that the output voltages can be determinative of at least three orientations: closed/almost closed; intermediate; and fully open/almost fully open. In the example above almost closed to closed and almost fully open to fully open spanned five degrees. Other implementations can cover other orientation ranges, such as 3 degrees, 7 degrees, or 10 degrees, for example, among others.

FIGS. 4A-4G collectively show another example system 100A. (The suffix "A" is used to indicate that elements of system 100A may be the same or different than those of system 100 introduced above relative to FIGS. 1A-1C). In this case, the system includes hinged device 102 that includes first portion 104 and second portion 106. Touch displays 402 are positioned on major surfaces 114.

Device 102 can interact with an accessory 404. The accessory 404 can be manifest as a keypad, keyboard, touch pad (e.g., trackpad), combination keyboard and touch pad, game controller, input device, etc. In this case, the accessory 404 is removably rotatable relative to the second portion 106. The accessory 404 may have one or more constrained dimensions, such as thickness $T_3$ (shown in FIG. 4C) and thus may be referred to as a thickness-constrained accessory.

Figure 4A:
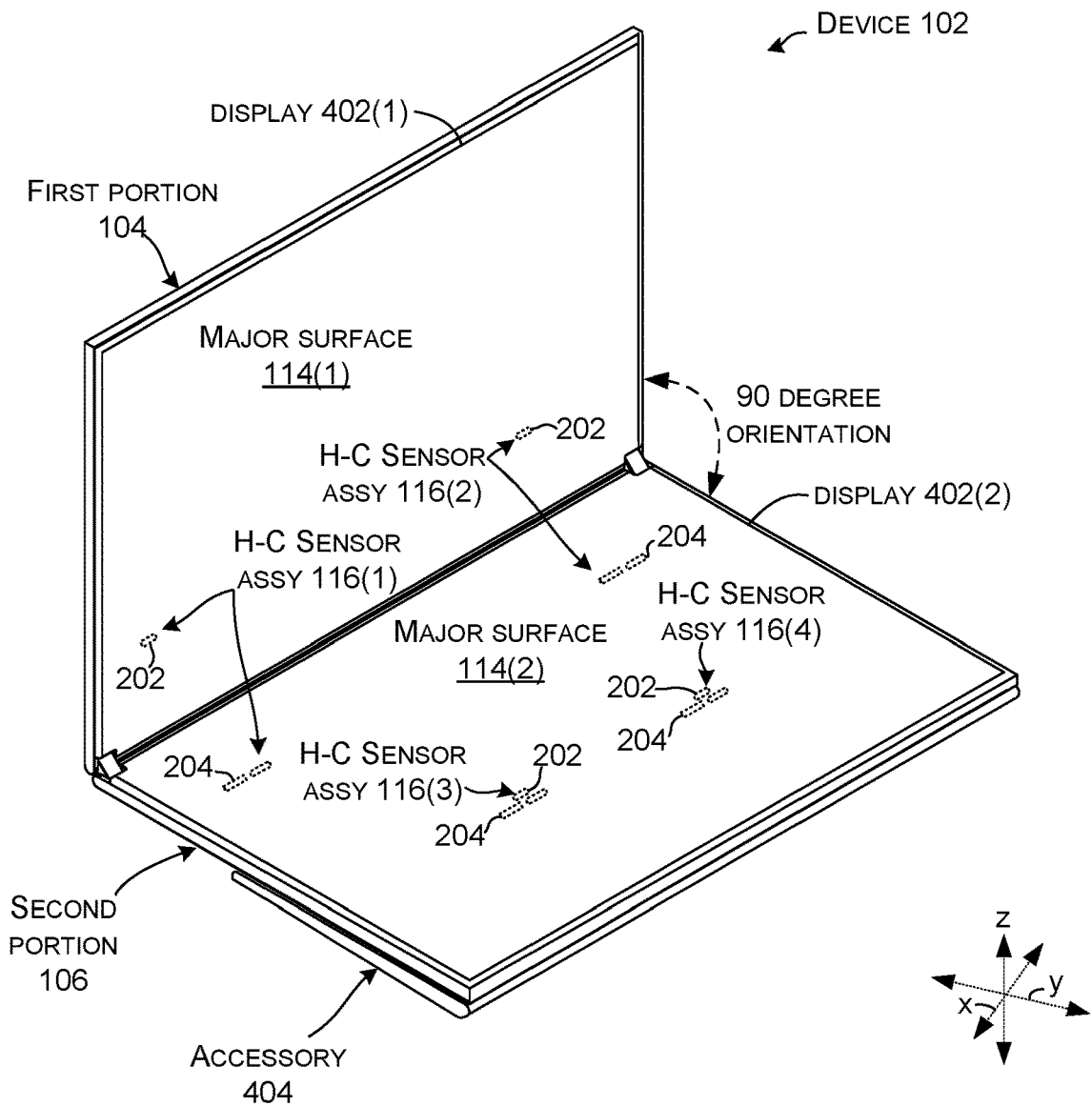
Figure 4B:
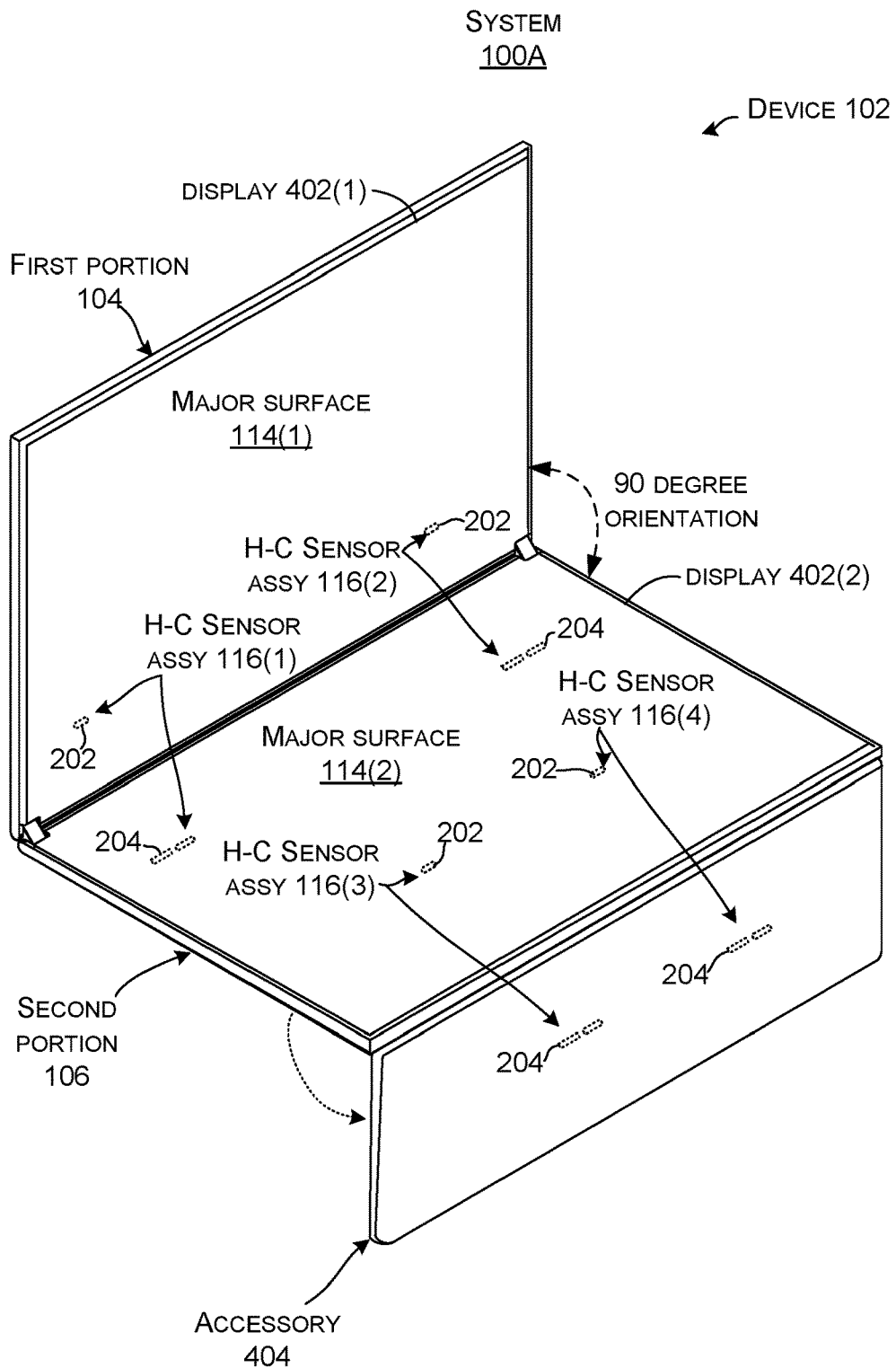
Figure 4C:
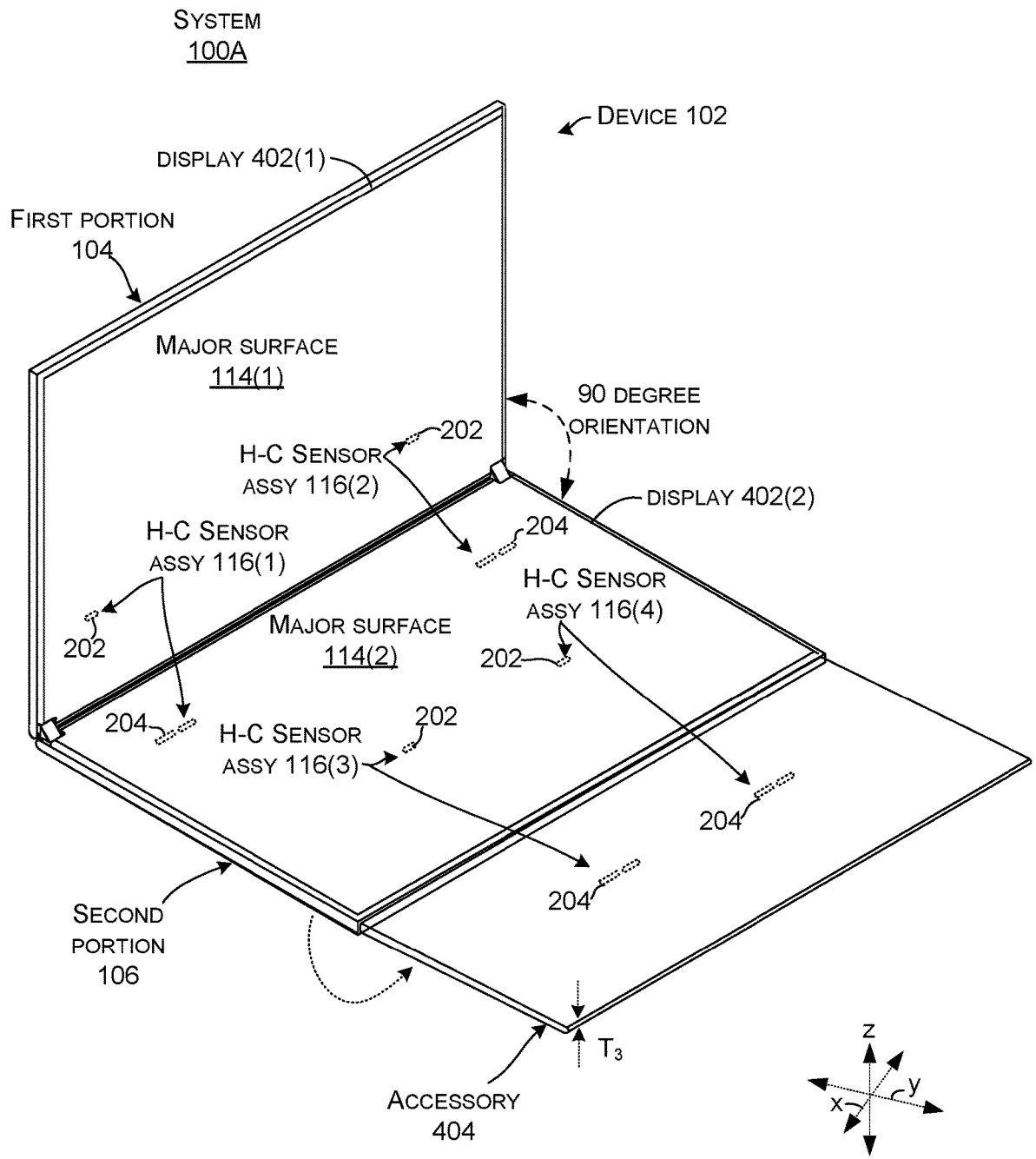
Figure 4D:
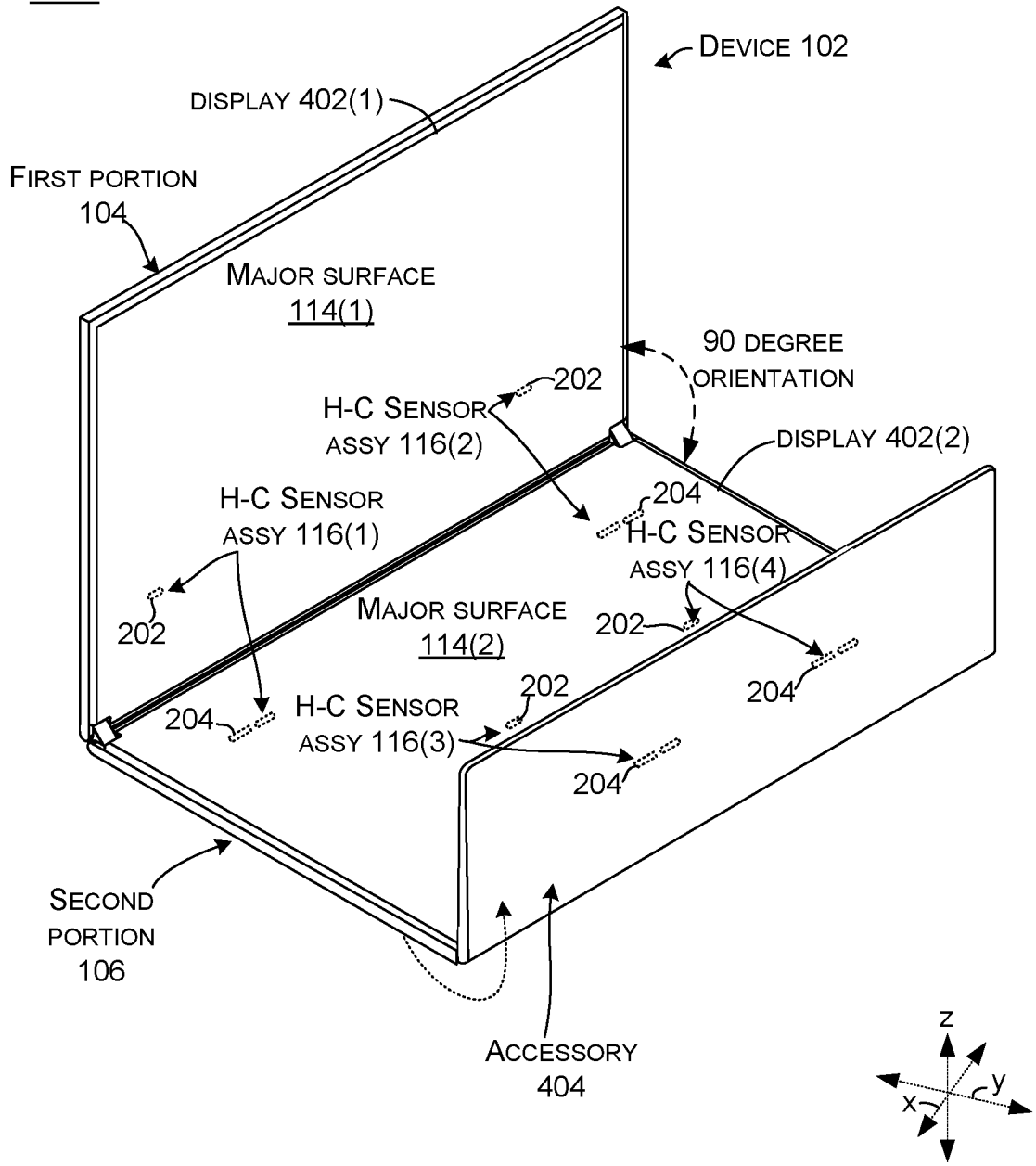
Figure 4E:
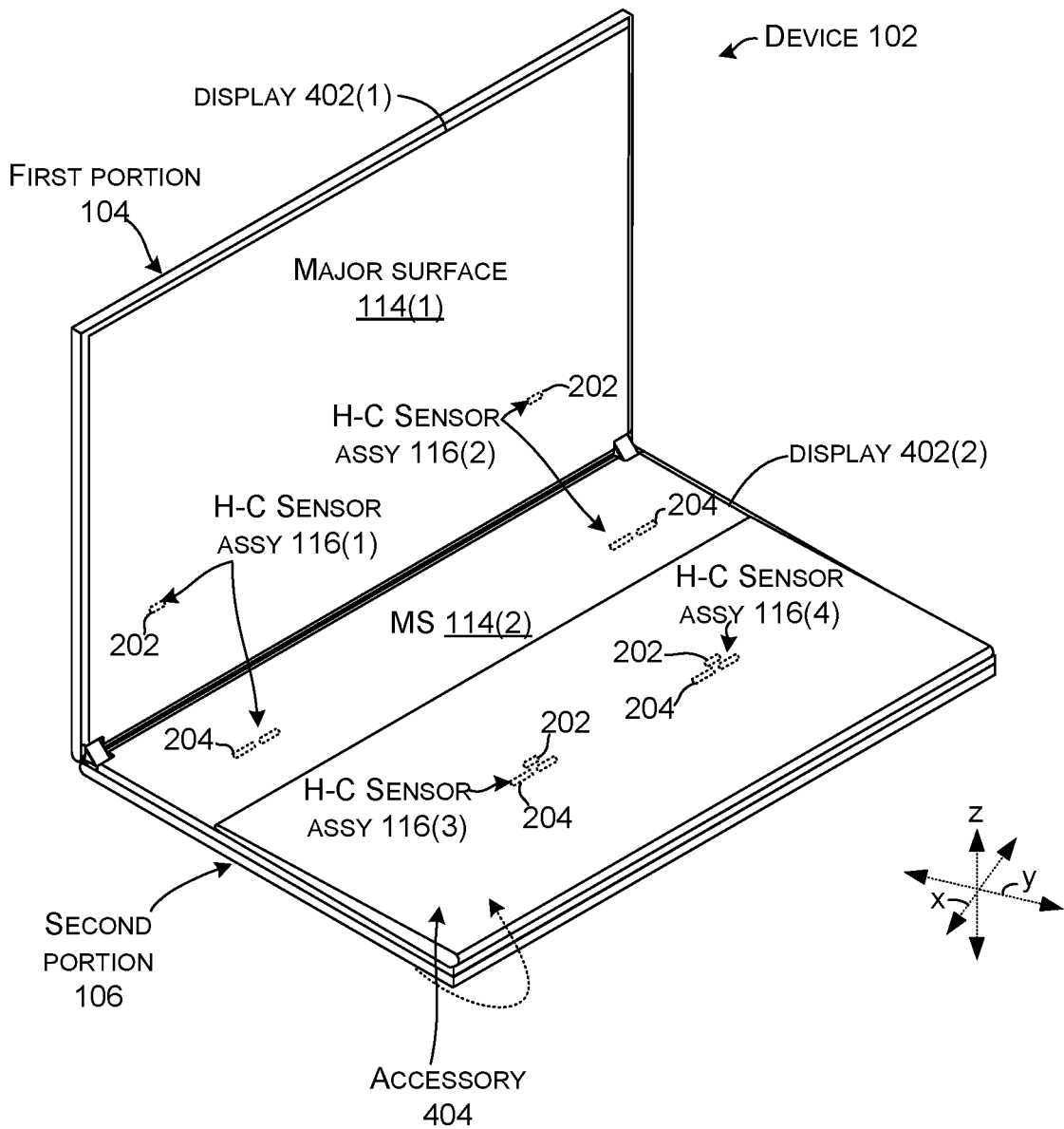
Figure 4F:
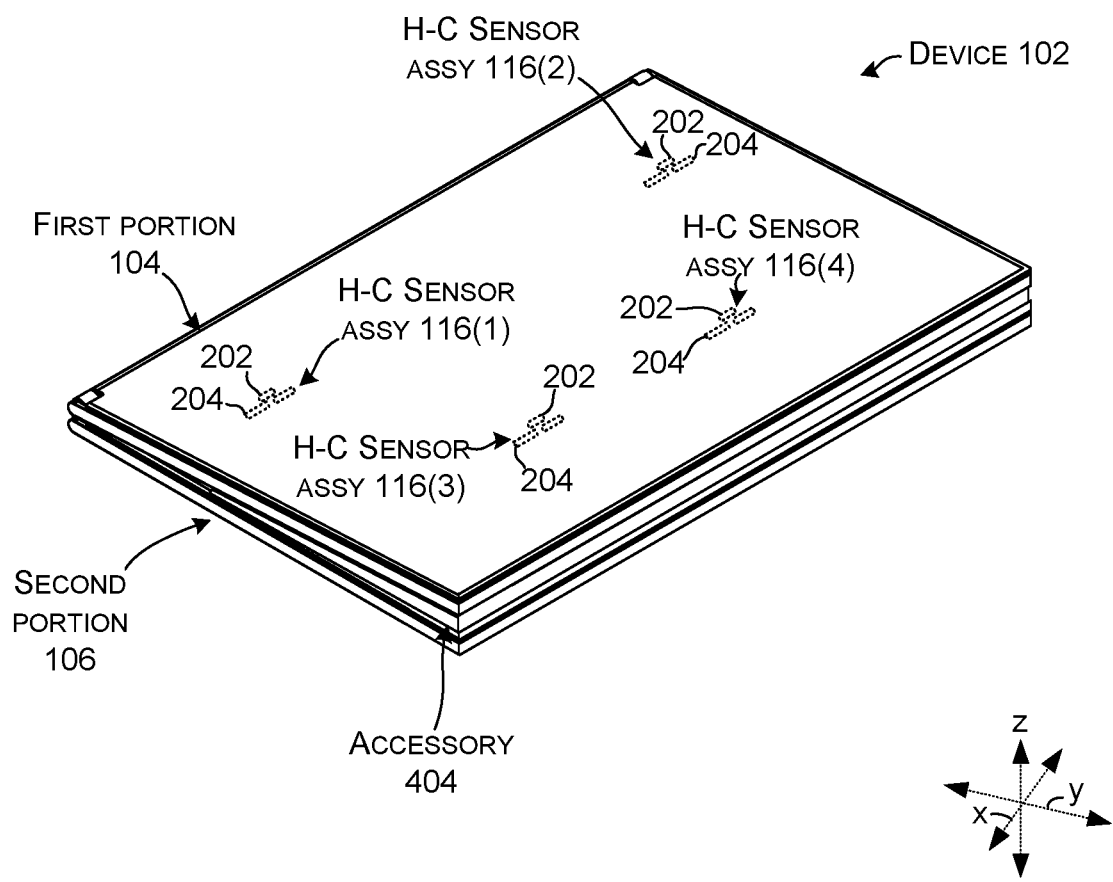

FIG. 4A shows the accessory 404 in a stowed or 360-degree orientation relative to portion 106. FIG. 4B shows the accessory rotated 90 degrees relative to the orientation of FIG. 4A. FIG. 4C shows the accessory rotated 180 degrees relative to the orientation of FIG. 4A. FIG. 4D shows the accessory rotated 270 degrees relative to the orientation of FIG. 4A. FIG. 4E shows the accessory rotated approximately 360 degrees relative to the orientation of FIG. 4A to a deployed or zero-degree orientation against display 402(2). FIG. 4F shows the first portion 104 closed on the second portion 106 with the accessory sandwiched in between and keeping the first and second portions slightly spaced apart (e.g., 357 degrees).

System 100A can employ multiple height-constrained sensor assemblies 116. (Note that the height-constrained sensor assemblies 116 are shown in ghost to indicate that they would not actually be visible in these views because they would likely be covered by other components). In the illustrated implementation, four height-constrained sensor assemblies 116(1)-116(4) are employed. Other numbers and/or positions of height-constrained sensor assemblies are contemplated.

In this case, height-constrained sensor assemblies 116(1) and 116(2) sense the orientation between the first and second portions 104 and 106. In this example the Hall effect sensors 202 are positioned in the first portion 104 and the magnet arrays 204 are positioned in the second portion 106. These height-constrained sensor assemblies 116(1) and 116(2) can function in the manner described relative to the height-constrained sensor assemblies 116 described relative to FIGS. 1A-3D and thus are described only briefly in this discussion.

In this implementation, height-constrained sensor assemblies 116(1) and 116(2) can function redundantly to reduce/avoid false readings that could potentially be caused by other magnets that may come into proximity to the device 102. Examples of other magnets can include any magnet that may be in the operating environment of the device. For instance, the user may have a magnetic paper clip holder on their desk or a magnetic power supply connector that attaches to the device. If such a magnet comes into proximity to either height-constrained sensor assemblies 116(1) or 116(2), it is possible that the corresponding Hall effect sensor could generate an erroneous output voltage. Potential problems associated with such an occurrence can be greatly decreased by employing multiple redundant height-constrained sensor assemblies 116. Thus, if height-constrained sensor assemblies 116(1) and 116(2) do not produce similar outputs (e.g., produce dissimilar output voltages) the output voltages can be temporarily ignored and resampled, among other potential responses.

In a similar manner, height-constrained sensor assemblies 116(3) and 116(4) can redundantly sense relative orientations between accessory 404 and second portion 106. In this example the Hall effect sensors 202 are positioned in the second portion 106 and the magnet arrays 204 are positioned in the accessory 404. However, the relative positions could be changed. For instance, all four Hall effect sensors 202 could be positioned in the second portion 106 and the associated magnet arrays 204 could be positioned in the first portion 104 and the accessory 404, for example.

In the orientation of FIG. 4A, height-constrained sensor assemblies 116(1) and 116(2) can both produce outputs that indicate that the first and second portions 104 and 106 are in an intermediate/intervening orientation (e.g., not close to the zero-degree orientation and not close to the 360-degree orientation). Height-constrained sensor assemblies 116(3) and 116(4) can both produce outputs that indicate that the second portion 106 and the accessory 404 are in the 360-degree orientation.

In the orientations of FIGS. 4B-4D, height-constrained sensor assemblies 116(1) and 116(2) can both produce outputs that indicate that the first and second portions 104 and 106 are in an intermediate orientation (e.g., not in a sub-range that includes the zero-degree orientation and not in another sub-range that includes the 360-degree orientation). Height-constrained sensor assemblies 116(3) and 116(4) can both produce outputs that indicate that the second portion 106 and the accessory 404 are also in intermediate orientations.

In the orientation of FIG. 4E, height-constrained sensor assemblies 116(1) and 116(2) can both produce outputs that indicate that the first and second portions 104 and 106 are in an intermediate orientation (e.g., not close to the zero-degree orientation and not close to the 360-degree orientation). Height-constrained sensor assemblies 116(3) and 116(4) can both produce outputs that indicate that the second portion 106 and the accessory 404 are in the 0-degree orientation.

In the orientation of FIG. 4F, height-constrained sensor assemblies 116(3) and 116(4) can both produce outputs that indicate that the second portion 106 and the accessory 404 are in the 0-degree orientation. Height-constrained sensor assemblies 116(1) and 116(2) can both produce outputs that indicate that the first and second portions 104 and 106 are in the substantially closed orientation. The height-constrained sensor assemblies 116(1) and 116(2) can be sensitive enough to sense through the accessory 404 and/or through a gap between the first and second portions associated with the accessory. Thus, in this case, the substantially closed orientation can include a range of orientations from about 0-5 degrees, for instance, and can sense scenarios where the first and second portions 104 and 106 are closed on the accessory 404.

In the illustrated configuration, the accessory 404 is as wide as the second portion 104. Other implementations are contemplated where the widths are different. Also note that in this case, the accessory device is wedge shaped to allow the first and second portions 104 and 106 to close evenly on the accessory in a radial fashion. Example hinge array configurations are described below relative to FIGS. 5A-10. FIGS. 6A and 6B show a magnet array configuration that is specifically adapted to this wedge shape configuration.

Note that this orientation information from the height-constrained sensor assemblies 116 can be used for various purposes, such as to control the displays 402 and/or the accessory 404, for instance. For example, when the output from the height-constrained sensor assemblies 116(1) and 116(2) indicate that the device portions are in an intermediate position, such as in FIG. 4A, content can be spread across both displays 402. If the displays are closed against one another in the zero-degree orientation, the displays can be turned off. If the displays are opened to the 360-degree orientation, the same content can be duplicated on both displays, for example. Similarly, when the accessory is in the 360-degree orientation of FIG. 4A, the user is not using the accessory and the accessory can be turned off. In the intermediate orientations, the accessory can be turned on and user input accepted. As illustrated in FIG. 4E, when the accessory is in closed orientation, underlying areas of display 402(2) can be inactivated, while the accessory is activated. In the sandwich closed orientation of FIG. 4F, the accessory can be turned off and the displays can be turned off. Of course, these are just examples of how the orientation information from the height-constrained sensor assemblies can be utilized, and other manifestations are contemplated.

The control functionality described above can be implemented by various device elements. In one configuration, control circuitry can receive output of the Hall effect sensor. The control circuitry can be configured to determine if (e.g., when) device portions are positioned in a substantially open or closed orientation based at least in part on the output. For instance, substantially open can be defined as the two device portions being at an orientation between 350 and 360 degrees, for instance. Similarly, substantially closed can be defined as the two device portions being at an orientation between zero and ten degrees, for instance. Substantially closed or open can alternatively or additionally be a distance range, such as contacting (e.g., zero millimeters separation) to ten millimeters of separation, for example. Other angle ranges and/or distances are contemplated.

In a similar manner, the control circuitry can determine if (e.g., when) a device accessory is proximate to the front (e.g., first) surface or the back (e.g., second) surface of the device based on output of the Hall effect sensor. In this case, 'proximate' can relate to specific range of rotational orientations (e.g., a range of degrees that includes a degree where contact occurs). For instance, proximate can mean touching the device (e.g., a surface of the accessory is adjacent to and contacting a surface of the device or within, for instance, five degrees of contacting the surface). Proximate can alternatively or additionally be a distance range, such as contacting (e.g., zero millimeters separation) to ten millimeters of separation, for example. Other angle ranges and/or distances are contemplated.

The control circuitry can be configured to control one or more device parameters, such as powering displays on or off and/or what and how content is displayed on the displays, based at least in part upon the orientation. The control circuitry can be manifest in various implementations of software, hardware, and/or combinations thereof. For instance, the control circuitry can be implemented as software code executed by the device's processor, such as a central processing unit (CPU) or graphics processing unit (GPU). Alternatively, the control circuitry can be implemented as a microcontroller or other dedicated and/or limited function processor, among other configurations.

Figure 5A:
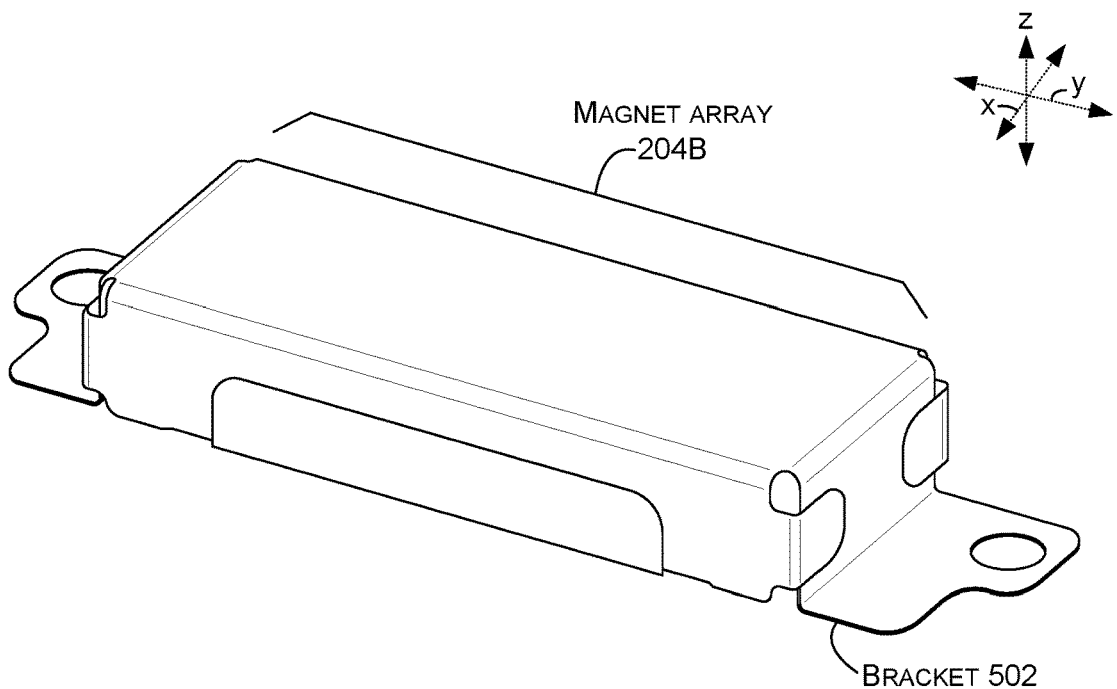
Figure 5B:
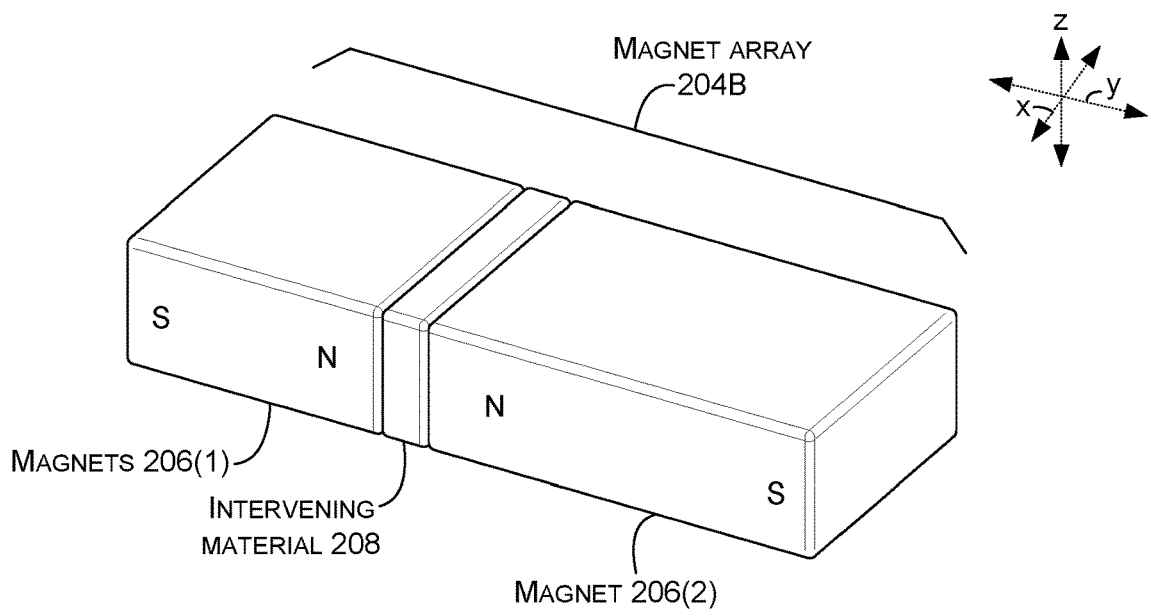
Figure 6A:
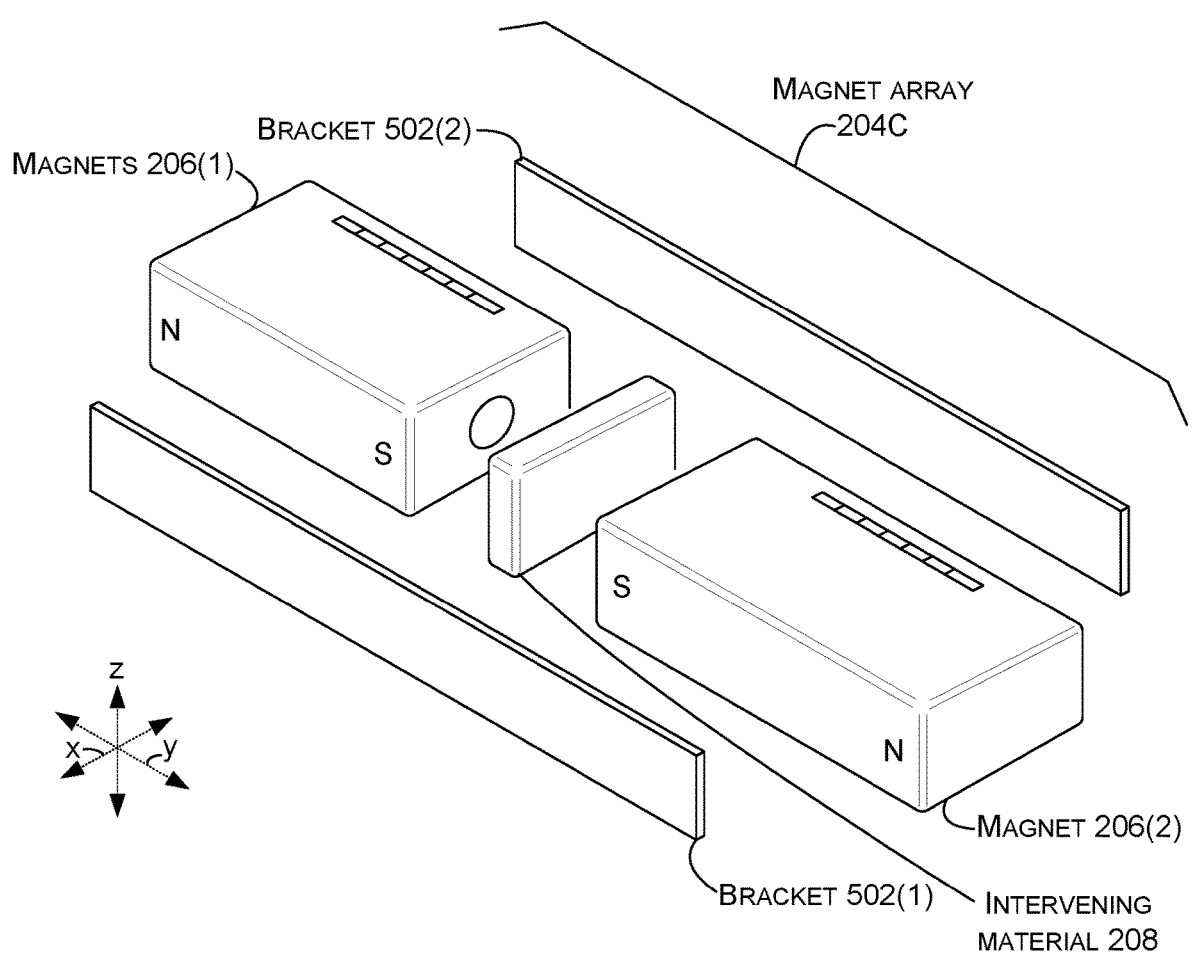
FIG. 6A shows an exploded perspective view of an example device in accordance with some implementations of the orientation sensing concepts.
Figure 6B:
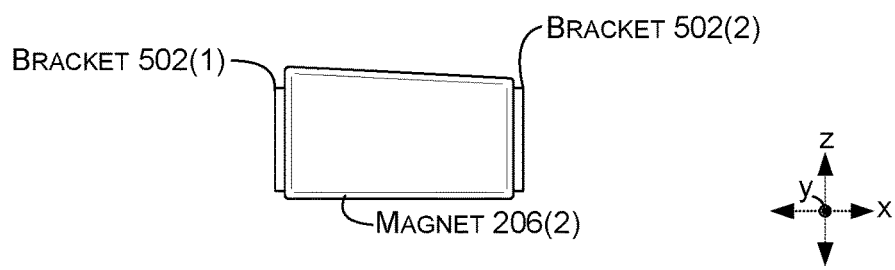
FIG. 6B shows an elevational view of an example device in accordance with some implementations of the orientation sensing concepts.

FIGS. 5A and 5B collectively show an example magnet array 204B. FIG. 5A shows the magnet array secured by a structural bracket 502. FIG. 5B shows the magnet array 204B in isolation. In this case, the magnet array is asymmetric in that magnet 206(1) is shorter than magnet 206(2) when measured along their long axes (e.g., parallel to the y reference axis). Symmetric magnets are illustrated relative to FIGS. 2A-2C.

In this example the North poles of the magnets are facing toward one another and are separated by intervening material 208. In this case the intervening material is a non-ferrous metal, such as stainless steel. Other materials, such as plastic or foam could be employed. The North poles of the magnets 206 repel one another. The structural bracket 502 can retain the magnets in their position against the intervening material despite the repulsive forces pushing the magnets apart. The structural bracket 502 may maintain this relationship over a lifetime of the device whereas other securing means, such as adhesive may weaken over time and constant stress and allow the magnets to spread away from one another. The structural bracket can, in turn, be secured to the device, such as to the first or second portion or to the accessory. For instance, fasteners can be used to secure the structural bracket to the housing (110, FIG. 1). Various materials can be employed to form the structural bracket. For example, metals, such as non-ferrous metals can be employed. Polymers and composites are alternative materials.

FIGS. 6A and 6B collectively show an example magnet array 204C. FIG. 6A shows an exploded perspective view of the magnet array 204C. FIG. 6B shows a cross-section of an individual magnet taken transverse the y reference axis. In this case, the magnet array 204C includes magnets 206(1) and 206(2) separated by intervening material 208 and secured by a two-part structural bracket 502.

Magnet array 204C can be useful for applications where the first and second surfaces are not parallel to one another. One such example is described above relative to the accessory 404 of FIGS. 4A-4F. In that case, the accessory is wedge shaped. In magnet array 204C, the magnets 206 can have a tapered thickness along the x reference axis to conform to the wedge shape of the accessory. Magnets that have rectangular cross sections are shown relative to FIGS. 5A and 5B. FIGS. 6A and 6B show a trapezoidal cross-section. Additional example shapes are described below relative to FIG. 7.

Figure 7:
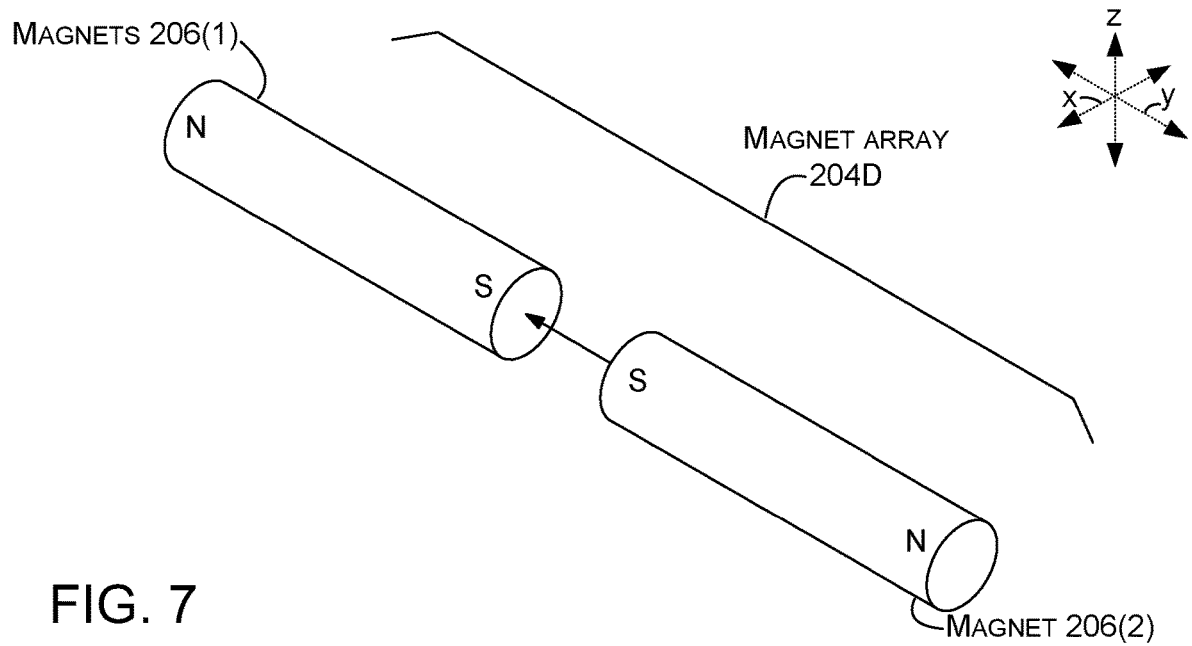

FIG. 7 shows another example magnet array 204D. In this case, elongate magnets 206(1) and 206(2) are generally cylindrical and have a round cross-section.

Figure 8:
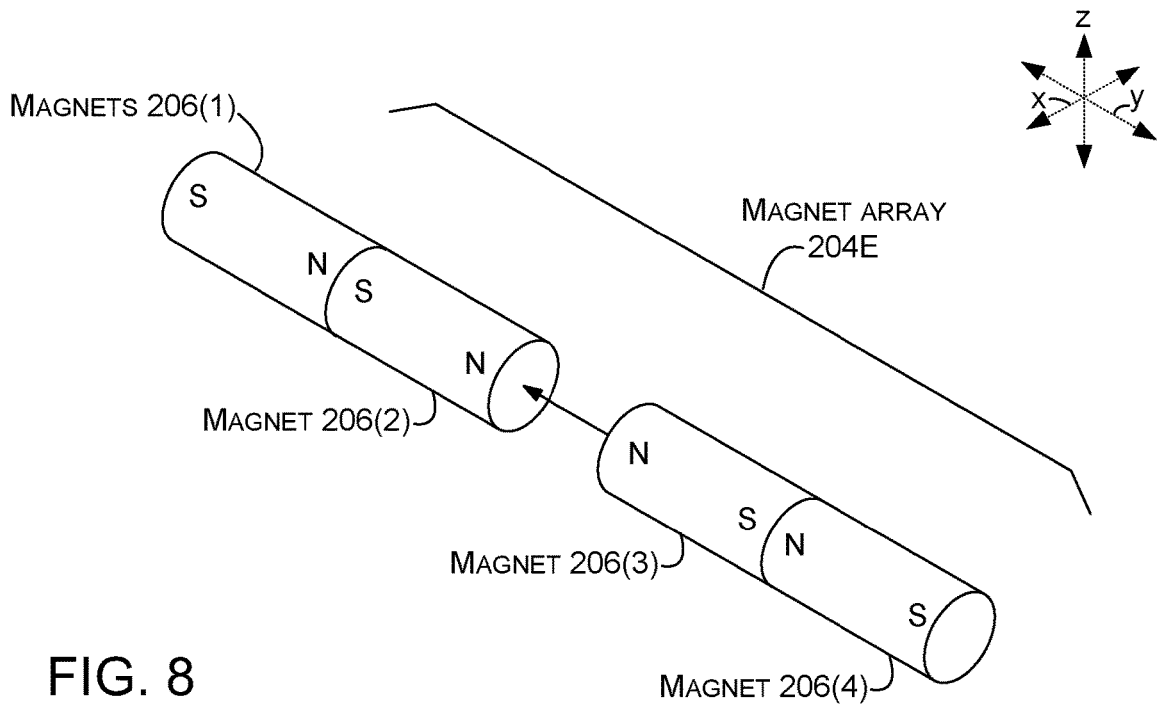

FIG. 8 shows another example magnet array 204E that is similar to magnet array 204D of FIG. 7. In this case, magnet array 204E includes four serially arranged and coaxial magnets 206(1)-206(4). Any number of magnets can be combined in a similar arrangement.

Figure 9:
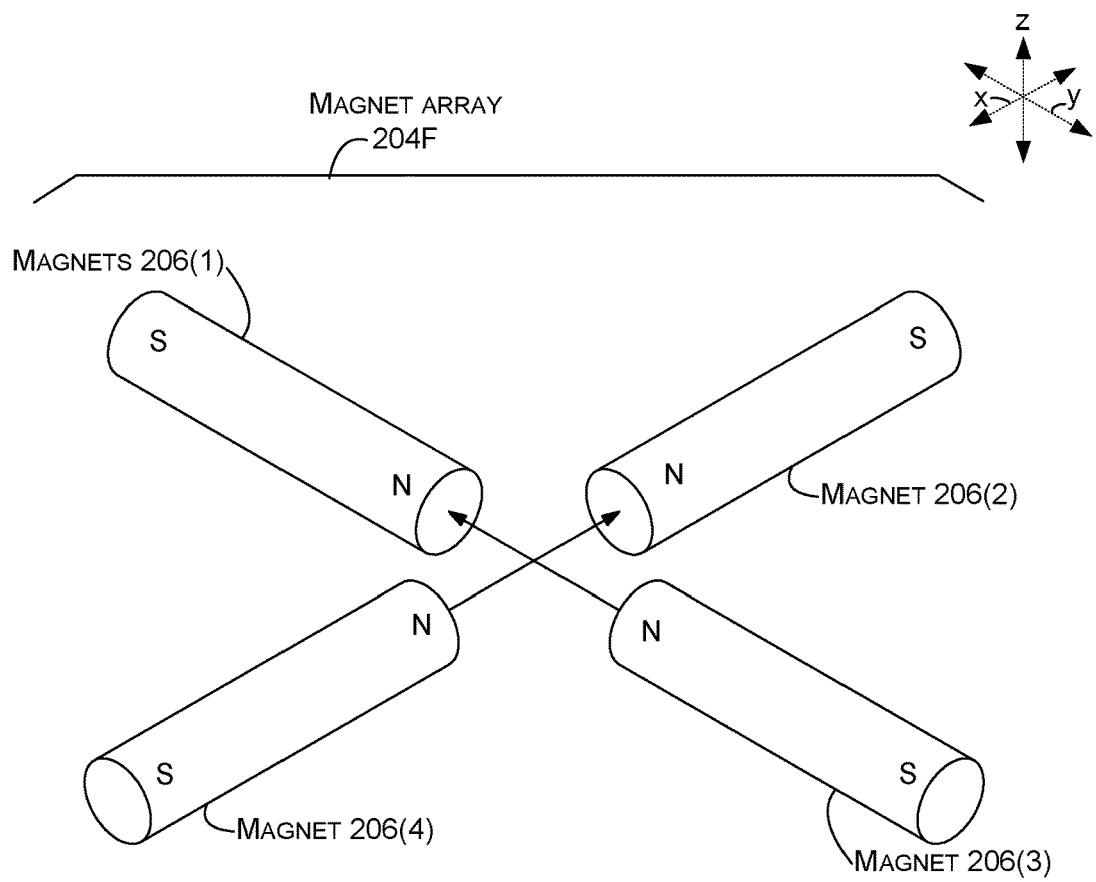

FIG. 9 shows another example magnet array 204F. In this case, the magnet array includes more than two magnets 206 oriented in a plane with matching poles facing inwardly. In this case four equally spaced magnets 206(1)-206(4) are distributed at 90 degree spacing. A similar configuration could be achieved with three magnets at 120 degree spacing, for example.

Figure 10:
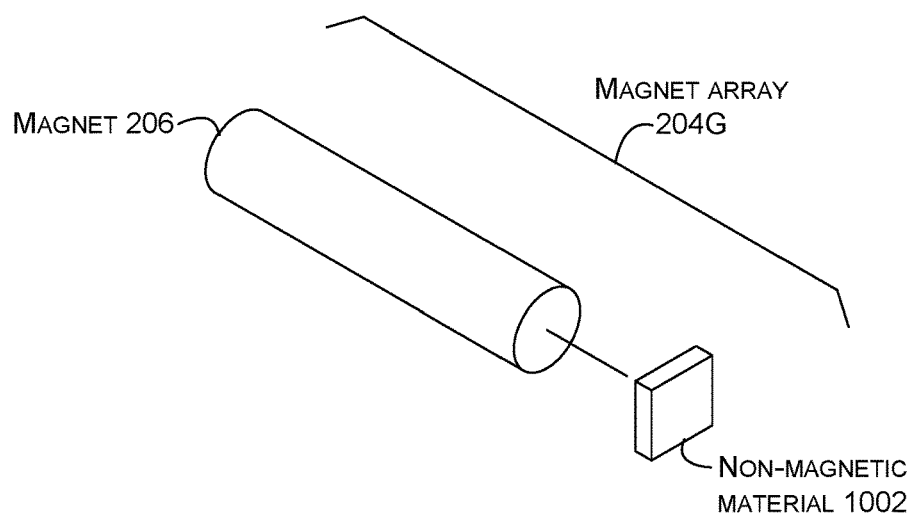

FIG. 10 show another example magnet array 204G. In this case, the magnet array includes magnet 206 co-axially arranged with a non-magnetic material 1002, such as wood, foam, or non-ferrous metal. Such a configuration could produce a magnetic field that can be sensed by a Hall effect sensor positioned perpendicular to a long axis of the magnet 206.

The present device orientation concepts are especially applicable to thickness-constrained devices, but can be utilized with any type of devices and/or associated accessories, such as but not limited to notebook computers, smart phones, wearable smart devices, tablets, and/or other types of existing, developing, and/or yet to be developed devices.

Various methods of manufacture, assembly, and/or use for these devices and associated accessories are contemplated beyond those shown above relative to FIGS. 1A-10.

Various examples are described above. Additional examples are described below. One example includes a device comprising a first portion and a second portion that can rotate relative to one another through a range of orientations from a closed orientation to an open orientation, the first portion defining a pair of major surfaces that define a thickness of the first portion and the second portion defining another pair of major surfaces that define a thickness of the second portion, wherein in the closed orientation a first major surface of the first portion is adjacent to a first major surface of the second portion, and wherein in the fully-open position a second major surface of the first portion is adjacent to a second major surface of the second portion, a first elongate magnet extending along a long axis that passes through North and South poles of the first elongate magnet, a second elongate magnet extending along a long axis that passes through North and South poles of the second elongate magnet, wherein the first elongate magnet and the second elongate magnet are positioned between the pair of major surfaces of the first portion such that the long axes of the first and second elongate magnets are co-axial with one another and are substantially parallel to the pair of major surfaces of the first portion and wherein either the North poles of the first and second elongate magnets are facing one another or the South poles of the first and second elongate magnets are facing one another, and a Hall effect sensor positioned between the pair of major surfaces of the second portion and configured to sense whether the first and second portions are in the closed orientation, the open orientation, or an intervening orientation based on magnetic field lines of the first and second elongate magnets.

Another example can include any of the above and/or below examples where the first major surface of the first portion is adjacent to the first major surface of the second portion when the first major surface of the first portion is contacting the first major surface of the second portion or is within five degrees of contacting the first major surface of the second portion.

Another example can include any of the above and/or below examples where the second major surface of the first portion is adjacent to a second major surface of the second portion when the first major surface of the first portion is contacting the second major surface of the second portion or is within five degrees of contacting the second major surface of the second portion.

Another example can include any of the above and/or below examples where there is no magnetic shielding between the first and second elongate magnets and the pair of major surfaces of the first portion.

Another example can include any of the above and/or below examples where there is no magnetic shielding between the Hall effect sensor and the pair of major surfaces of the second portion.

Another example can include any of the above and/or below examples where the South poles of the first and second elongate magnets are touching one another, or wherein the North poles of the first and second elongate magnets are touching one another.

Another example can include any of the above and/or below examples where the South poles of the first and second elongate magnets are facing one another and are spaced apart from one another.

Another example can include any of the above and/or below examples where a distance that the South poles are spaced apart from one another equals a width of the Hall effect sensor.

Another example can include any of the above and/or below examples where the long axes of the first and second elongate magnets are parallel to an axis of rotation of the first and second portions.

Another example can include any of the above and/or below examples where substantially parallel comprises being parallel or within 10 degrees of being parallel.

Another example can include any of the above and/or below examples where the closed orientation comprises a range from zero degrees of angle to 10 degrees of angle between the first major surface of the first portion and the first major surface of the second portion.

Another example can include any of the above and/or below examples where the open orientation comprises a range from 355 degrees of angle to 360 degrees of angle between the second major surface of the first portion and the second major surface of the second portion.

Another example includes a system comprising a device having: a housing that defines a constrained thickness, a Hall effect sensor within the housing and having a sensing axis, and control circuitry within the housing configured to determine if a device accessory is proximate to a first surface or a second surface of the device based on output of the Hall effect sensor. The device accessory comprises a pair of opposing and co-axially arranged magnets that when positioned perpendicularly to the sensing axis can be sensed by the Hall effect sensor to determine whether the pair of opposing and co-axially arranged magnets are above or below the housing Another example can include any of the above and/or below examples where the device accessory comprises a keypad, a trackpad, or a game controller.

Another example can include any of the above and/or below examples where the housing comprises first and second parallel surfaces and wherein the thickness is measured between and perpendicular to the first and second surfaces.

Another example can include any of the above and/or below examples where the sensing axis is perpendicular to the first and second parallel surfaces.

Another example can include any of the above and/or below examples where when the device accessory is positioned against the first or second parallel surfaces, an axis passing through North and South poles of both magnets of the pair of coaxially arranged magnets is parallel to the first and second parallel surfaces.

Another example can include any of the above and/or below examples where the Hall effect sensor occupies all of the constrained thickness within the housing.

Another example can include any of the above and/or below examples where the control circuitry can distinguish when the accessory is within a defined range of rotation of the first surface or the second surface based on the output from the Hall effect sensor.

Another example can include any of the above and/or below examples where the defined range of rotation relative to the first surface is zero to five degrees and the defined range of rotation relative to the second surface is 355 degrees to 360 degrees.

Another example includes a system comprising a Hall effect sensor configured to sense magnetic fields along a sensing axis and a pair of elongate magnets having co-axial and opposite magnetic axes that are perpendicular to the sensing axis.

Another example can include any of the above and/or below examples where the system comprises first and second thickness-constrained devices and wherein the Hall effect sensor is positioned in the first device and the pair of elongate magnets are positioned in the second device.

Another example can include any of the above and/or below examples where the system comprises a thickness-constrained device and a thickness-constrained accessory and wherein the Hall effect sensor is positioned in either the device or the accessory and the pair of elongate magnets are positioned in the other of the device and the accessory.

Although techniques, methods, devices, systems, etc., pertaining to orientation sensing are described in language specific to structural features and/or methodological acts, it is to be understood that the subject matter defined in the appended claims is not limited to the specific features or acts described. Rather, the specific features and acts are disclosed as example forms of implementing the claimed methods, devices, systems, etc.

The invention claimed is:

1. A device comprising:
    a first portion and a second portion that can rotate relative to one another through a range of orientations from a closed orientation through an intermediate orientation to an open orientation, the first portion defining a pair of major surfaces that define a thickness of the first portion and the second portion defining another pair of major surfaces that define a thickness of the second portion, wherein in the closed orientation a first major surface of the first portion is adjacent to a first major surface of the second portion, and wherein in the open orientation a second major surface of the first portion is adjacent to a second major surface of the second portion;
    a first elongate magnet extending along a long axis that passes through North and South poles of the first elongate magnet;
    a second elongate magnet extending along a long axis that passes through North and South poles of the second elongate magnet, wherein the first elongate magnet and the second elongate magnet are positioned between the pair of major surfaces of the first portion such that the long axes of the first and second elongate magnets are co-axial with one another and are substantially parallel to the pair of major surfaces of the first portion, and wherein either the North poles of the first and second elongate magnets are facing one another or the South poles of the first and second elongate magnets are facing one another; and
    a Hall effect sensor positioned between the pair of major surfaces of the second portion and configured to sense whether the first and second portions are in the closed orientation, the open orientation, or the intermediate orientation based on magnetic field lines of the first and second elongate magnets.

2. The device of claim 1, wherein there is no magnetic shielding between the first and second elongate magnets and the pair of major surfaces of the first portion.

3. The device of claim 1, wherein there is no magnetic shielding between the Hall effect sensor and the pair of major surfaces of the second portion.

4. The device of claim 1, wherein the South poles of the first and second elongate magnets are touching one another, or wherein the North poles of the first and second elongate magnets are touching one another.

5. The device of claim 1, wherein the South poles of the first and second elongate magnets are facing one another and are spaced apart from one another.

6. The device of claim 5, wherein a distance that the South poles are spaced apart from one another equals a width of the Hall effect sensor.

7. The device of claim 1, wherein the long axes of the first and second elongate magnets are parallel to an axis of rotation of the first and second portions.

8. The device of claim 1, wherein the substantially parallel comprises being parallel or within 10 degrees of being parallel.

9. The device of claim 1, wherein the closed orientation comprises a range from zero degrees of angle to 10 degrees of angle between the first major surface of the first portion and the first major surface of the second portion.

10. The device of claim 1, wherein the open orientation comprises a range from 350 degrees of angle to 360 degrees of angle between the second major surface of the first portion and the second major surface of the second portion.

11. A system, comprising:
    a device accessory including a pair of magnets that are co-axially arranged and have same poles facing each other; and
    a device having:
        a housing having a first surface and a second surface on opposite sides that define a constrained thickness,
        a Hall effect sensor within the housing and having a sensing axis, the Hall effect sensor configured to generate an output based on a polarity generated by the pair of magnets and sensed by the Hall effect sensor when the pair of magnets are positioned perpendicularly to the sensing axis of the Hall effect sensor, and
        control circuitry configured to determine whether the device accessory is proximate to the first surface or the second surface of the device based on the output of the Hall effect sensor.

12. The system of claim 11, wherein the device accessory comprises a keypad, a trackpad, or a game controller.

13. The system of claim 11, wherein the first surface and the second surface of the housing are substantially parallel and wherein the thickness is measured between and perpendicular to the first and second surfaces.

14. The system of claim 13, wherein the sensing axis is perpendicular to the first and second surfaces.

15. The system of claim 14, wherein when the device accessory is positioned against the first surface or the second surface, an axis passing through North and South poles of the pair of magnets is parallel to the first and second surfaces.

16. The system of claim 11, wherein the Hall effect sensor occupies all of the constrained thickness within the housing.

17. The system of claim 11, wherein the control circuitry is configured to determine whether the device accessory is within a defined range of rotation of the first surface or the second surface based on the output from the Hall effect sensor.

18. The system of claim 17, wherein the defined range of rotation relative to the first surface is zero to five degrees and the defined range of rotation relative to the second surface is 355 degrees to 360 degrees.

19. A system, comprising:
a pair of elongate magnets having co-axial magnetic axes and having same poles facing each other, the pair of elongate magnets generating magnetic fields; and
a Hall effect sensor configured to sense the magnetic fields along a sensing axis that is perpendicular to the magnetic axes, the Hall effect sensor capable of distinguishing whether the pair of elongate magnets are adjacent to one surface or an opposite surface of the Hall effect sensor based on a polarity generated by the pair of elongate magnets and sensed by the Hall effect sensor.

20. The system of claim 19, wherein the system comprises first and second thickness-constrained devices and wherein the Hall effect sensor is positioned in the first device and the pair of elongate magnets are positioned in the second device.

\* \* \* \* \*